United States Patent [19]
Christensen et al.

[11] Patent Number: 5,686,038
[45] Date of Patent: Nov. 11, 1997

[54] RESIN TRANSFER MOLDING OF COMPOSITE MATERIALS THAT EMIT VOLATILES DURING PROCESSING

[75] Inventors: Stephen Christensen, Issaquah; Michael A. Walker, Sumner, both of Wash.

[73] Assignee: The Boeing Company, Seattle, Wash.

[21] Appl. No.: 466,266

[22] Filed: Jun. 6, 1995

[51] Int. Cl.$^6$ .............................. B29C 45/14; B29C 45/34
[52] U.S. Cl. .................. 264/257; 264/328.7; 264/40.5; 425/555; 425/406; 425/546
[58] Field of Search .......................... 164/97, 98, 236; 264/328.7, 257, 40.5; 425/555, 406, 420, 546

[56] References Cited

U.S. PATENT DOCUMENTS

| | | |
|---|---|---|
| 2,035,190 | 3/1936 | Renfrew . |
| 3,666,600 | 5/1972 | Yoshino . |
| 4,028,455 | 6/1977 | Ueda et al. . |
| 4,065,340 | 12/1977 | Dickerson . |
| 4,217,157 | 8/1980 | Stoltze et al. ............... 156/87 |
| 4,311,661 | 1/1982 | Palmer . |
| 4,405,538 | 9/1983 | Saidla . |
| 4,562,033 | 12/1985 | Johnson et al. . |
| 4,622,091 | 11/1986 | Letterman . |
| 4,681,651 | 7/1987 | Brozovic et al. ............. 156/382 |
| 4,740,346 | 4/1988 | Freeman . |
| 4,755,341 | 7/1988 | Reavely et al. . |
| 4,782,586 | 11/1988 | Joo et al. ..................... 29/623.5 |
| 4,808,362 | 2/1989 | Freeman . |
| 4,816,106 | 3/1989 | Turris et al. ................. 156/285 |
| 4,869,770 | 9/1989 | Christensen et al. . |
| 4,915,896 | 4/1990 | Rachal . |
| 4,919,876 | 4/1990 | Savage et al. . |
| 4,942,013 | 7/1990 | Palmer et al. . |
| 4,983,341 | 1/1991 | Kromrey . |
| 4,988,469 | 1/1991 | Reavely et al. . |
| 5,009,687 | 4/1991 | Kromrey . |

(List continued on next page.)

FOREIGN PATENT DOCUMENTS

| | | | |
|---|---|---|---|
| 57-95429 | 6/1982 | Japan ............................ 425/555 |
| 62-220311 | 9/1987 | Japan ............................ 425/555 |
| 4-22559 | 1/1992 | Japan ............................ 164/97 |
| 4-200855 | 7/1992 | Japan ............................ 164/97 |

OTHER PUBLICATIONS

D. Stover (ed.), "Resin-transfer molding for advanced composites" Adv. Composite, Mar./Apr. 1990, p. 60–80.

"Resin transfer molding of composite structures" Aero. Eng'g, Dec. 1989, pp. 23–26.

"More composites in commercial transports," Aero. Eng'g, Dec. 1989, pp. 19–22.

*Primary Examiner*—Joseph J. Hail, III
*Assistant Examiner*—L.-H. Lin
*Attorney, Agent, or Firm*—John C. Hammar

[57] ABSTRACT

A method and apparatus for resin transfer molding composite materials that emit volatiles. The apparatus includes an RTM tool, a constant displacement injection pump, a heater connected to a power supply, one or more porous tool inserts, and one or more articulated tool inserts. The porous tool inserts are mounted within the RTM tool and allow volatiles produced during processing to flow through the inserts. The volatiles are drawn through the porous tool inserts and out through an exhaust port. The articulated tools are also mounted within the interior of the RTM tool. The articulated tools are movable in order to increase and decrease the volume of the RTM tool. As volatiles are emitted, the articulated tools are moved in order to decrease the volume of the tool. The articulate tools are also used to apply a consolidation force to the resin and fiber-reinforced preform within the tool. In accordance with a method of the invention, an unpolymerized thermoplastic resin is thinned with an appropriate solvent to an acceptable viscosity. The resin is then injected into the RTM tool using a constant displacement pump. The tool is then heated causing the resin to polymerize and emit volatiles. Volatiles are withdrawn through porous tool inserts within the tool. After the majority of volatiles are withdrawn, the resin is consolidated to form a composite part.

21 Claims, 8 Drawing Sheets

U.S. PATENT DOCUMENTS

| | | |
|---|---|---|
| 5,045,251 | 9/1991 | Johnson . |
| 5,059,273 | 10/1991 | Boyce et al. . |
| 5,102,604 | 4/1992 | Sidles et al. . |
| 5,106,568 | 4/1992 | Honka . |
| 5,116,216 | 5/1992 | Cochran et al. ............ 425/388 |
| 5,134,002 | 7/1992 | Vallier . |
| 5,151,277 | 9/1992 | Bernardon et al. . |
| 5,152,949 | 10/1992 | Leoni et al. . |
| 5,190,094 | 3/1993 | Knoess . |
| 5,236,646 | 8/1993 | Cochran et al. . |
| 5,242,651 | 9/1993 | Brayden et al. ............ 264/510 |
| 5,443,778 | 8/1995 | Schlingman ............ 425/546 |
| 5,518,385 | 5/1996 | Graff ............ 425/546 |

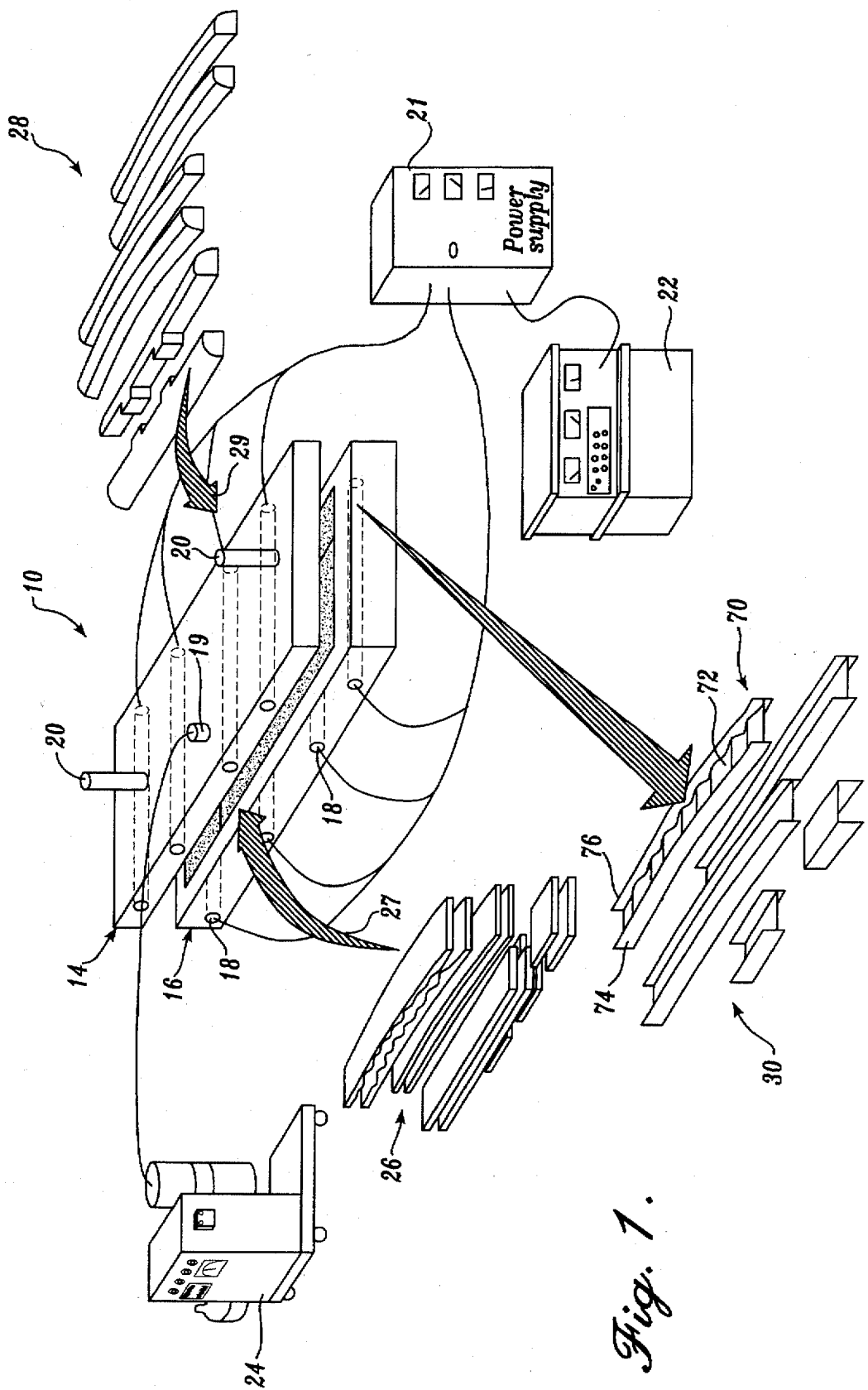

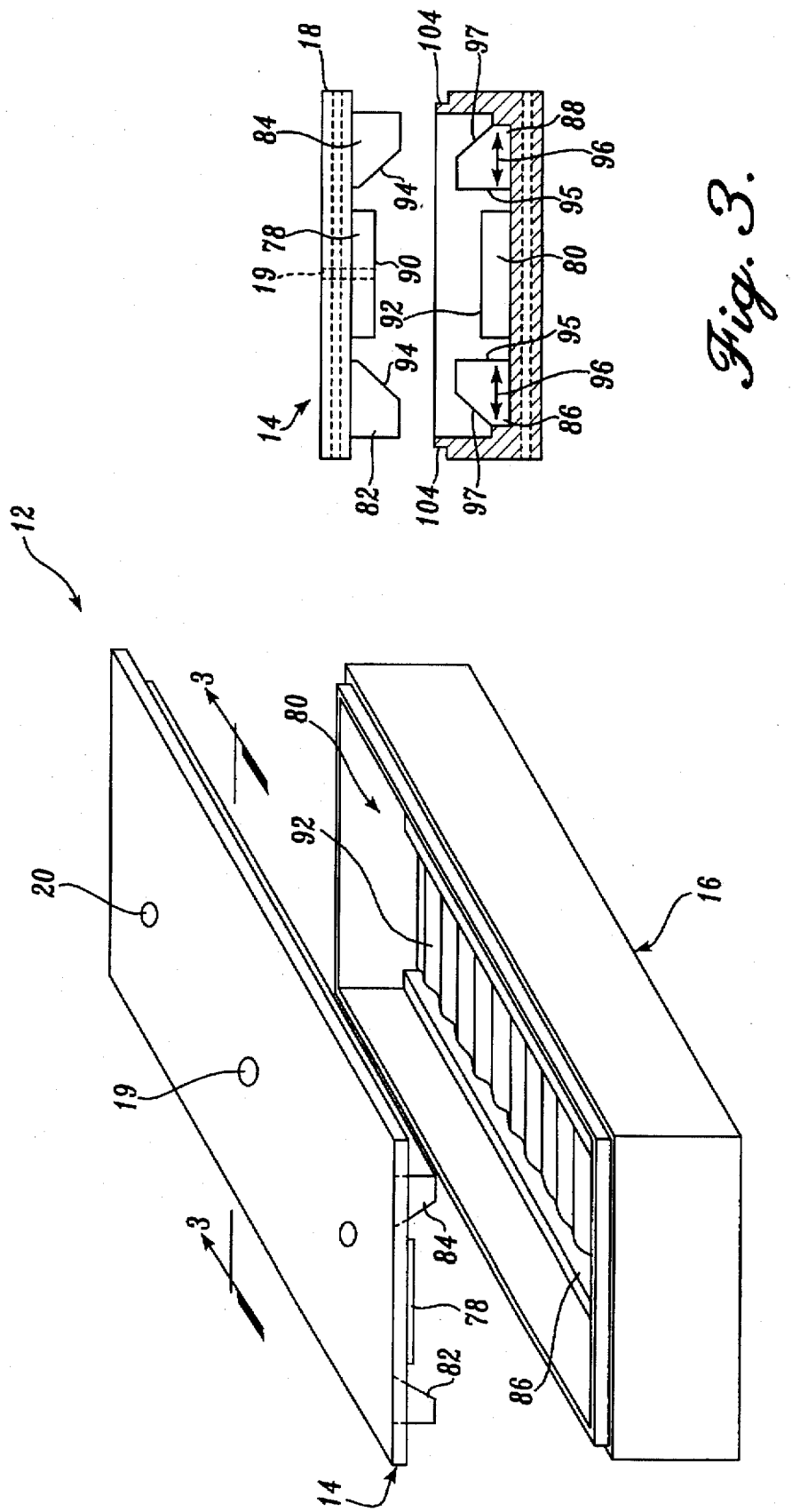

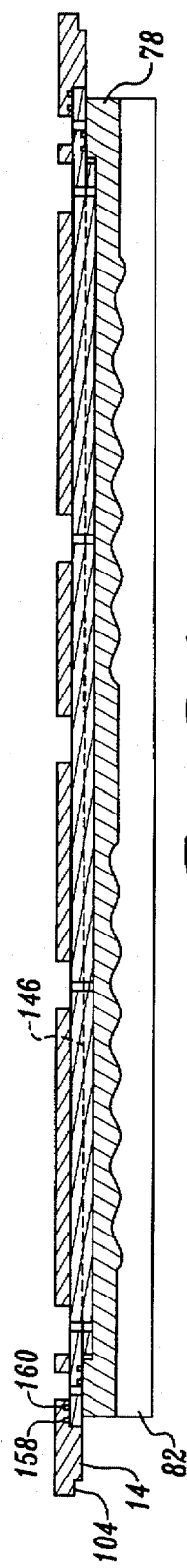
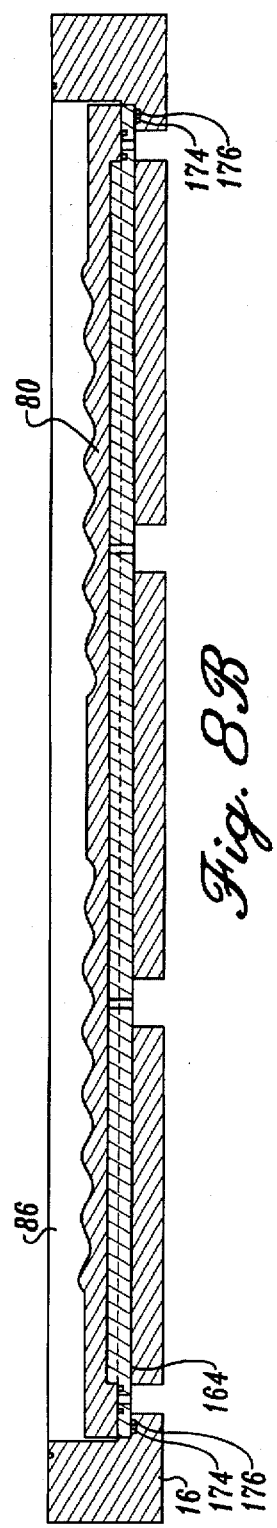
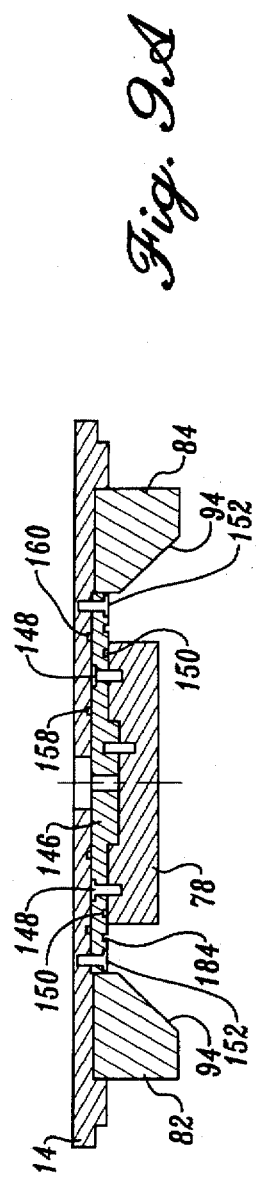
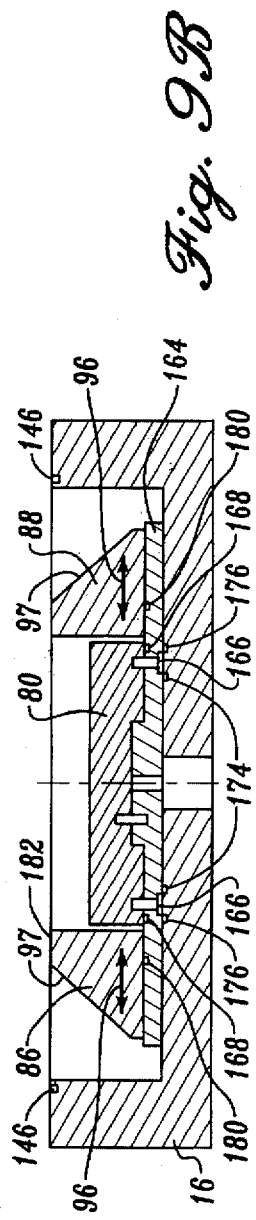

RESIN TRANSFER MOLDING OF COMPOSITE MATERIALS THAT EMIT VOLATILES DURING PROCESSING

FIELD OF THE INVENTION

The invention relates to methods and apparatus for resin transfer molding composite materials and more particularly to the resin transfer molding of composites that emit volatiles during processing.

BACKGROUND OF THE INVENTION

The use of composite materials in the manufacture of aircraft and other lightweight structures has increased steadily since the introduction of such materials. Composite materials have a high strength-to-weight ratio and high stiffness, making them attractive for use in lightweight structures. Some drawbacks to using composite materials is their high fabrication costs and low damage tolerance. It is difficult to produce composite parts for the same cost and having the same degree of damage tolerance as comparable metal parts. This cost differential is especially notable in large-scale parts having complex contours.

Another disadvantage of composite materials in some applications is their relatively low temperature tolerance. Most high-strength, fiber-reinforced composite materials have glass transition temperatures in the 300° F. range.

One contributor to the cost of composite structures is the amount of manual labor required during fabrication. Composite parts having complex contours, for example sine wave spars, are formed by manually laying up individual layers of composite material on a contoured mandrel. The laid-up composite material and mandrel are then placed within a vacuum bag and cured within an autoclave. Although high quality parts are produced using the autoclave process, it is labor-intensive and expensive.

Larger parts having gradual contours, for example large wing skins, may be fabricated using automated tape laying machines. Automated tape laying machines are used to robotically lay up the layers of composite material, thus reducing the amount of manual labor used. After laying up the part with a tape laying machine, the part is manually bagged and cured in an autoclave. Using automated tape laying machines reduces fabrication costs. However, automated tape laying machines cannot lay up material over sharp complex contours and thus, cannot be used to fabricate many parts.

One method being investigated for reducing fabrication costs is resin transfer molding (RTM) processes. In an RTM process, a closed mold is used. A prefabricated fiber reinforced preform is placed within the interior of the mold. A resin is then injected into the closed mold. Sufficient resin is injected to saturate the fiber reinforced preform and fill the interior of the mold. The temperature of the mold and resin is then elevated to cure the resin. After curing, the mold is opened and the formed part is removed.

In RTM processing, the dimensions of the part are closely defined by the interior of the mold. The RTM process eliminates the intensive hand lay up and vacuum bagging procedures used in prior manufacturing methods. RTM processes can also be used to fabricate parts having complex contours.

However, past RTM processes are limited to the use of a small number of thermal setting resins, such as epoxy resins. The epoxy resins used have low viscosity's that allow them to be injected under reasonable pressures. Such resins flow easily, allowing them to saturate the fiber reinforced preform. Even using such resins, there is a frequent occurrence of voids or areas of porosity within the formed composite parts.

It is important in the RTM process to ensure that all air is driven out of the mold during resin injection; otherwise, air may be trapped within the mold. Air trapped within the mold causes areas of porosity and voids in the formed part.

Voids or areas of porosity are especially prevalent in parts having a high volume of fibrous reinforcement. The greater the density of the fiber-reinforced preform, the harder it is for the resin to flow through the reinforcement, thus, the greater the likelihood of voids or areas of porosity in the formed part. One method to reduce porosity is to evacuate the interior of the mold prior to injecting the resin. Although evacuating the mold helps, it does not eliminate the occurrence of areas of porosity in parts formed using the RTM process. Improved RTM processes are needed to help reduce the occurrence of areas of porosity.

Because the volume of the mold used in the RTM process is fixed, there is no way to account for resin shrinkage during the molding process. In order to reduce problems associated with resin shrinkage, specialized resins are used. Such resins generally have shrinkage rates of less than 2% during curing. Even so, resin shrinkage can contribute to the porosity of the formed part. Resin shrinkage also affects the tolerances of the formed part.

Currently, the RTM process is applicable to forming composite parts from a limited number of specialized resins. These resins generally have limited damage tolerance. In addition, such resins are generally not usable above temperatures in the 300° F. range.

Recent research in composite materials has resulted in resins with increased damage tolerance and temperature capabilities. A number of promising resins include toughened epoxy resins and thermoplastic resins. In addition to having increased damage tolerance, such resins can withstand higher temperature environments than past epoxy resins. A few of the promising resins include DuPont's Avimid K™ (type IIIA and B), G.E.'s Ultem™, and ICI's APC-HTA™. All of these resins have glass transition temperatures in the range of 400°–500° F.

Current RTM processes cannot take advantage of these new resins. Thermoplastic resins and most toughened epoxy resins have viscosities that prevent them from being used in the RTM process. In addition, such resins do not flow sufficiently to allow them to saturate the fiber reinforced preform. Most thermoplastic resins are fully polymerized solids at room temperature and even at high temperatures have viscosity's that make them unsuitable for the RTM process. Some thermoplastic resins are available in an unpolymerized form. However, such resins contain large quantities of volatiles that are emitted during polymerization and curing.

Such volatile producing thermoplastic resins include melt-fusible polyimides based on pyromellitic dianhydride. One such resin is commercially sold under the trade name Avimid K™ (type III A and B) by the DuPont Company and is commonly referred to in the industry as "K-III." The chemical composition of K-III is set forth in U.S. Pat. No. 4,485,140, the disclosure of which is incorporated by reference.

Volatiles produced by K-III and some other resins make them unacceptable for use in RTM processes. In the case of K-III, large volumes of water vapor, ethanol gas, and N-Methyl pyrrolidone ("NMP"), are produced during processing. If such volatiles are not drawn off during processing, the volatiles produce voids or areas of porosity within the formed part.

The volatiles emitted by K-III and some other resins account for a large volume of the unprocessed resin. Thus, the volume of a part is formed with K-III less than the volume of uncured resin used to form the part.

In RTM processes, the dimensions of the mold defines the dimensions of the formed part. The dimensions of the mold are fixed throughout the processing cycle. Because the volume of the mold is fixed, the mold cannot account for the loss in resin volume caused by volatiles emitted during processing. In addition, there are no provisions in current molds to withdraw the large volumes of volatiles produced during processing. Therefore, the volatiles become trapped within the mold creating unacceptable porosity.

For the reasons discussed above, current RTM processes are limited to a narrow selection of resins. As can be seen from this discussion, there exists a need for improved RTM processes that can produce void free composite parts from a variety of resins, including resins that produce volatiles during processing. The present invention is directed toward fulfilling this need.

SUMMARY OF THE INVENTION

The present invention is a method and apparatus for resin transfer molding composite parts from resin systems that emit volatiles during processing. The invention may be used with either thermoplastic or thermoset resin systems. The invention allows volatiles produced during processing to be withdrawn from the interior of the resin transfer molding tool. The invention also accounts for the changing volume of resin within the tool as gaseous volatiles are withdrawn from the interior of the tool. The present invention can also be used to increase the quality of parts formed from current RTM resins.

In one method according to the invention, a mold having a cavity that establishes the shape of the part formed is provided. A fiber reinforced preform is placed within the cavity. A resin is then injected into the cavity to fill the volume of the cavity. The temperature of the resin is then elevated to a temperature at which the resin emits volatiles. These volatiles are withdrawn through porous tool inserts within the mold. After the majority of the volatiles are withdrawn, a consolidation pressure is placed on the resin and reinforced preform to form the composite part.

In accordance with other aspects of the method, an unpolymerized thermoplastic resin is used. The resin is thinned using an appropriate solvent to a viscosity at which it may be injected into the mold. As volatiles are withdrawn from the mold, the volume of the mold is reduced to account for the loss in resin volume. After the resin and reinforced preform are consolidated, the temperature is reduced and the formed composite part is removed.

In an embodiment of an apparatus according to the invention, a tool having a cavity that determines the shape of the formed composite part is provided. An injection pump is used to inject resin into the interior of the cavity. A heater is then used to heat the resin to a temperature at which the resin emits volatiles. These volatiles are withdrawn through porous tool inserts located in the cavity.

In accordance with other aspects of the invention, the tool is movable between an expanded configuration and a contracted configuration. In the contracted configuration, the interior of the mold has a smaller volume than in the expanded configuration. The movement of the mold between the expanded and contracted configurations allows the mold to account for the changing volume of resin present within the cavity.

In accordance with still other aspects of the invention, the resin is maintained at an elevated temperature until the majority of the volatiles have been withdrawn. A consolidation pressure is then placed on the resin and maintained for approximately one hour. After the resin is consolidated, the formed composite part is cooled at a rate of between 1° and 5° F. per minute.

The invention allows resin transfer molding to be used with resin systems that could not be used in the past. The invention's use of porous tools allows gaseous volatiles or air to be withdrawn through the tools while maintaining the dimensional tolerances of the formed composite part. Using the present invention, resin transfer molded parts may be formed of thermoplastic resin systems such as K-IIIB or thermosetting resin systems that produce volatiles during processing. By allowing new resin systems to be used, the invention allows the resin transfer molding of parts having greater damage tolerance and capable of withstanding higher temperatures.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein:

FIG. 1 is a schematic representation of an RTM process for producing composite parts according to the present invention;

FIG. 2 is a perspective view of a tool having an adjustable volume for use in the RTM process of FIG. 1;

FIG. 3 is a cross-section of the tool of FIG. 2 at the location illustrated in FIG. 2;

FIG. 8A is a longitudinal cross-section of the upper tool and upper tool insert;

FIG. 8B is a longitudinal cross-section of the lower tool and lower tool insert;

FIG. 9A is a transverse cross-section of the upper tool, upper tool insert, and tool stops;

FIG. 9B is a transverse cross-section of the lower tool, lower tool insert, and side rail tools;

DETAILED DESCRIPTION OF THE PREFERRED EMBODIMENT

Figure 4A:
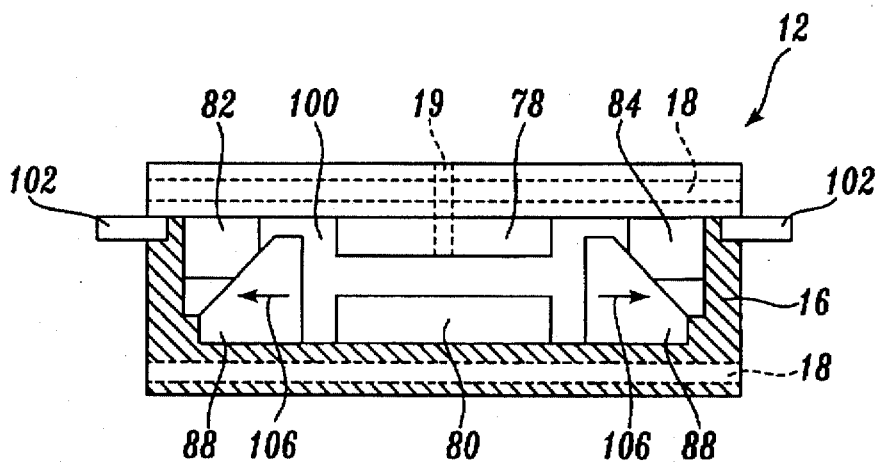
FIG. 4A is a cross-section of the tool of FIG. 2 in a closed and expanded position.

FIG. 1 is a schematic overview of a preferred embodiment of an apparatus for resin transfer molding according to the invention. The RTM apparatus 10 includes an RTM mold or tool 12 having an upper tool 14, a lower tool 16, a plurality of heating rods 18, an injection/exhaust port 19, resin exhausts 20, a power supply 21, a computer controlled power regulator 22, and a constant displacement resin pump 24. The RTM apparatus 10 further includes one or more porous tool inserts 26 and one or more articulated tool inserts 28 that are placed with the RTM tool 12 as illustrated by arrows 27 and 29. The RTM apparatus 10 may be used with various tool configurations to form a variety of composite parts 30.

The preferred embodiment of the invention is described below with respect to the fabrication of a composite sine wave spar 70 using the K-III B resins. However, the invention is not limited to the fabrication of specific parts and can be used with various tooling configurations to form a variety of parts. Further, the invention is not limited to use with specific resins and can be used with any appropriate thermoplastic thermoset, or other resin.

A general overview of a method of fabrication according to the invention will first be discussed by reference to FIG. 1. The structure of the RTM apparatus 10 and details of the preferred embodiment will then be discussed in more detail.

As discussed in the background section, one of the factors preventing resin transfer molding of thermoplastic and toughened epoxy resins is the resin's high viscosity's. Most toughened epoxy and thermoplastic resins have viscosity's too high to be used in the RTM process. Theoretically, solvents can be used to thin the resins to an acceptable viscosity. However, toughened epoxy and thermoplastic resins cannot generally be thinned without affecting performance. Furthermore, most thermoplastic resins are only available in a polymerized solid form and are not subject to thinning. Even when thinned, the solvents used create volatiles during processing. Such volatiles must be removed during processing to avoid creating areas of porosity in the formed part. In addition, as the solvents are emitted as volatiles, the volume of resin decreases. Thus, the RTM tool 12 must be able to account for the changing volume of the resin.

In the invention, resins are selected that either have viscosity's acceptable for injection molding or that may be thinned with appropriate solvents. In the case of thermoplastic resins, unpolymerized resins are used. In an unpolymerized state, such thermoplastic resins may be thinned with appropriate solvents as described below.

Prior to molding, a fiber-reinforced preform (not shown) is placed within the interior of the RTM tool 12. Resin is then injected into the interior of the tool 12 through the injection/exhaust port 19 (FIG. 1) using the constant displacement pump 24.

After the resin is injected, the RTM tool 12 is heated using a plurality of heating rods 18, power supply 21 and computer controlled power regulator 22. The power supplied by the power supply 21 is carefully controlled by the regulator 22 to maintain the temperature of the RTM tool 12 within the processing requirements of the resin. As the resin is heated, volatiles emitted during processing are drawn through passages within the porous tool inserts 26 and out through the injection/exhaust port 19.

In order to account for the changing resin volume during processing, the RTM tool 12 incorporates one or more articulated tools 28. After the volatiles are drawn off, the articulated tools 28 move to decrease the interior volume of the RTM tool 12. The articulated tooling 28 also places a consolidation pressure on the resin and preform. This consolidation pressure forms and consolidates the resin and fiber-reinforced preform to form a void-free composite part. Once formed, the RTM tool 12 is opened and the part is removed.

The method and apparatus of the invention will now be discussed in more detail by reference to FIGS. 1–5. In the preferred embodiment, a thermoplastic resin was selected for use in the RTM process. The thermoplastic resin chosen was DuPont's Avimid K (type IIIB) ("K-III"). K-III is a melt fusible polyimide based on pyromellitic dianhydride and 2,2-bis[3,5-dichloro-4-(4-aminophenoxy)-phenyl]propane, alone or in combination with other diamines. In its unpolymerized form, K-III may be thinned using N-methyl pyrrolidone ("NMP") solvent to reduce its viscosity. As discussed above, K-III emits gaseous volatiles including NMP during processing. Therefore, reducing the viscosity of the unpolymerized K-III with NMP increases the quantity of gaseous volatiles emitted during processing.

As shown in block 31 (FIG. 5), the first step in the fabrication procedure is to design the part (in this case sine wave spar 70) based on structural loads and part geometry. Once designed, the total volume of the sine wave spar 70 is determined as shown in block 32. The volume of the fiber-reinforced preform (not shown) used is then calculated as shown in block 34.

Next, the volume of cured resin needed is calculated as shown in block 35. The volume of resin needed is calculated by subtracting the volume of the preform from the volume of the formed part determined in blocks 32 and 34. As shown in block 36, the volume of thinned, unpolymerized resin needed to produce the final cured volume of resin is then determined. The ratio of thinned, unpolymerized resin to cured resin may be calculated by determining the quantity of solvent and solids within the resins. Alternately, experimental tests may be used to determine the ratio of thinned, unpolymerized resin to cured resin. This ratio is then used to calculate the volume of thinned, unpolymerized resin that must be injected into the tool to form the cured part.

The RTM tool 12 is designed knowing the total volume of injected resin used and the geometry and volume of cured part as shown in block 38. In order to account for the loss in resin volume due to volatiles, the tool 12 is designed to move between an expanded configuration and a contracted configuration. In the expanded configuration, the volume of the tool 12 is sized to contain the volume of injected resin used. In the contracted configuration, the volume of tool 12 is sized to the dimensions of the cured part.

In the preferred embodiment, the changing volume of the resin and the production of volatiles are accounted for using porous tool inserts 26 and articulated tool inserts 28 (FIG. 1). The structure and operation of the porous tool inserts 26 and articulated tool inserts 28 are discussed in detail below.

Once the RTM tool 12 is designed, the resin is thinned to an acceptable viscosity for injection molding as shown in block 40. In the present embodiment, the resin is thinned using an NMP solvent to a viscosity of approximately 5–10 poise and injected at approximately 25 psi. However, if higher injection pressures are use, the K-III may be injected at greater viscosity's. Unpolymerized K-III has been successfully injected at viscosity's of up to 100 poise using approximately 175 psi. For comparison, the viscosity of current RTM epoxy resins is approximately 0.5–2.0 poise.

To minimize the viscosity of the K-III when injecting, it is heated to an elevated temperature within the pump 24. In the preferred embodiment, the K-III is injected at a temperature of approximately 175° F.

Prior to injection, a release agent is applied to the surfaces of the RTM tool 12 that contact the resin as shown in block 41. Several appropriate release agents are commercially available. In the preferred embodiment, Frekote 700™ manufactured by Dexter Corp., located at Windsor Locks, Conn., is used to coat the tools. Frekote 700 helps to prevent the cured resin from sticking to the tools. However, Frekote 700 does not obstruct the passageways in the porous tool inserts 26 as described in more detail below.

After applying the release agent, the fiber-reinforced preform is placed within the tool 12 as illustrated in block 42. The tool 12 is then closed and heated to approximately 175° F. using heaters 18, power supply 21 and power regulator 22 (FIG. 1). Heating the RTM tool 12 prior to injecting the resin helps to maintain the viscosity of the resin as low as possible during the injection process.

The resin is injected into the RTM tool 12 using the constant displacement pump 24 as shown in block 44. In the preferred embodiment, the resin is injected into the RTM tool 12 at a pressure of approximately 25 psi. Such a pressure is easily obtainable using the constant displacement pump 24 and does not create unreasonable pressures within the interior of the tooling 12. It is desirable to inject the resin at low pressures to avoid using highly structurally-reinforced tools 12 capable of withstanding higher pressures. The use of a low injection pressure also increases safety and decreases tool sealing problems.

In alternate embodiments, higher injection pressures could be used. For example, RTM processing at injection pressures of between 50 and 175 psi have been successfully used.

The resin is injected into the RTM tool 12 until its interior is full and resin has begun flowing out of the resin exhaust ports 20 within the tool. The exhaust ports 20 are then closed and the constant displacement pump 24 is shut off and disconnected from the RTM tool 12.

Figure 11:
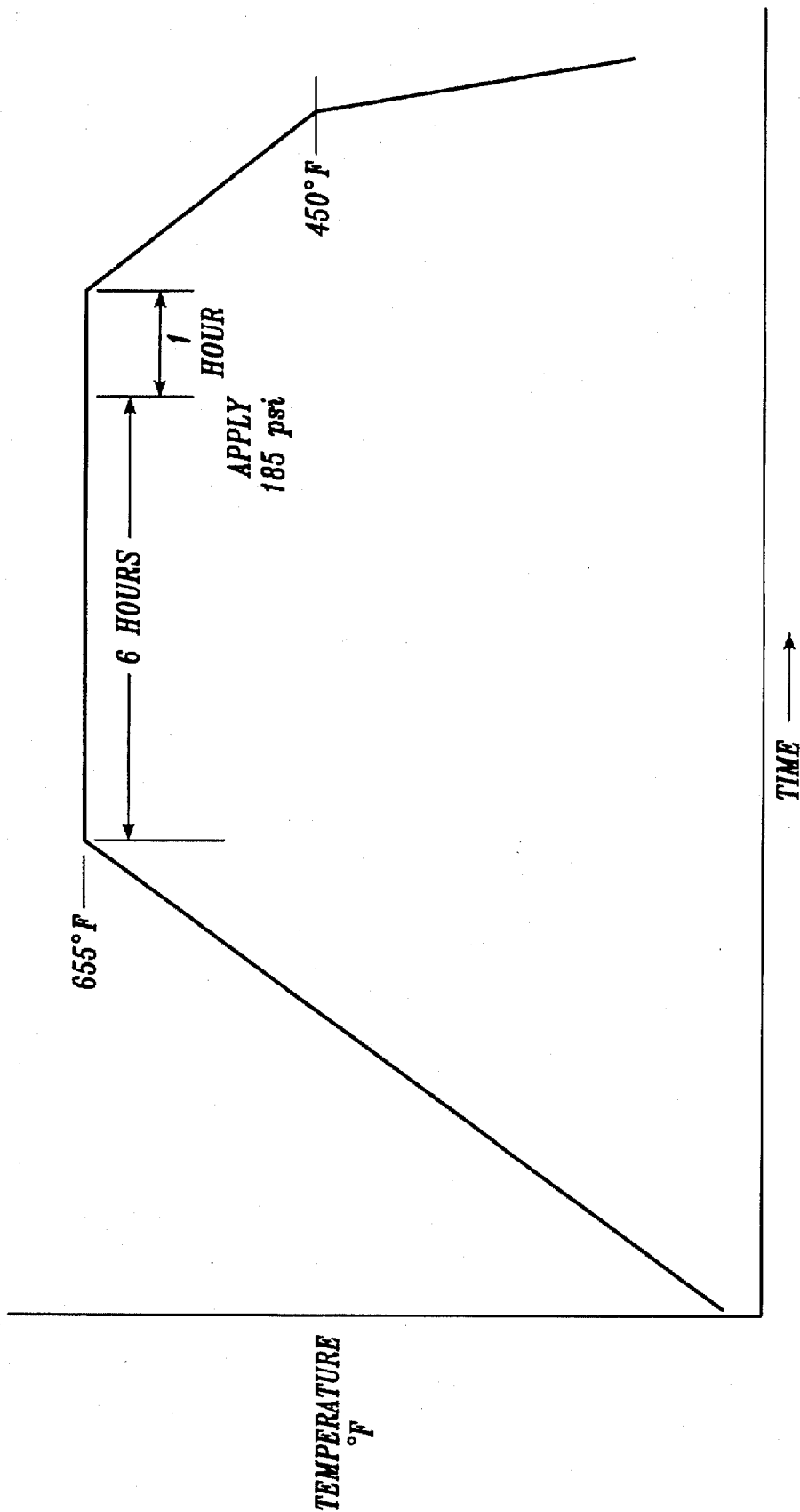
FIG. 11 is a graph of the resin processing cycle, wherein time is plotted along the x-axis and temperature is plotted along the y-axis.

A vacuum is then applied to the porous tool inserts 26 through the injection/exhaust port 19 (block 46) as described in more detail below. In the preferred embodiment, the RTM tool 12 and resin are then heated at a rate of approximately 1.0° F. per minute until a temperature of approximately 655° F. is reached, as illustrated in block 48 and FIG. 11. As the temperature of the unpolymerized K-III resin is elevated, the resin polymerizes and forms a solid. As the temperature continues to rise, the solid polymerized resin melts and emits volatiles. As described in detail below, these volatiles are evacuated through the tool inserts 26 and out of the tool 12 through the exhaust port 19. The temperature of the resin is maintained at 655° F. for approximately six hours in order to allow majority of the volatiles to be withdrawn as illustrated in block 50 and FIG. 11.

After the majority of the volatiles are withdrawn, a consolidation pressure of approximately 185 psi is applied to the resin and reinforced preform using the articulated tools 28 as shown in block 52. The structure and operation of the articulated tools 28 is described in detail below. The consolidation pressure is maintained for approximately one hour as shown in block 54 and FIG. 11. During consolidation, any remaining volatiles are withdrawn through the exhaust port 19.

In the preferred embodiment, after consolidation the temperature of the resin is reduced from 655° F. to 450° F. at a rate of approximately 1.0°–2.0° F./min. The temperature is then reduced to room temperature at approximately 5° F./min. as shown in block 56. After cooling, the RTM tool 12 is opened and the formed composite part removed as shown in block 58.

The processing cycle discussed above produces good results using K-III to fabricate a sine wave spar. However, the parameters of the processing cycle are influenced by a number of variables including the resin used, and the shape and thickness of the part formed. Therefore, in other embodiments of the invention the processing parameters could change.

The general structure and operation of the RTM tool 12 will now be described in more detail by reference to FIGS. 2–4B. In the preferred embodiment, The RTM tool 12 is used to form a sine wave spar 70 (FIGS. 1 and 4C). The sine wave spar 70 includes a central web 72 having a sine wave contour. The central web 72 extends between left 74 and right 76 spar caps.

The upper and lower tools 14 and 16 are configured to be joined to form the enclosed RTM tool 12. The lower tool 16 is generally rectangular and includes upward extending vertical walls. The upper tool 12 (FIG. 2) is generally planar and is sized to form a lid for the lower tool 16. The porous tool inserts 26 and articulated tools 28 are contained within the upper and lower tools 14 and 16. The porous tool inserts 26 used to form the spar 70 include an upper tool insert 78 and a lower tool insert 80 (FIG. 3). The articulated tools 28 used to form the spar 70 include left and right tool stops 82 and 84 (FIGS. 2–4B) and left and right side rail tools 86 and 88.

The upper and lower tool inserts 78 and 80 are generally rectangular and include forming surfaces 90 and 92 (FIGS. 2 and 3), respectively. The forming surfaces 90 and 92 have a sine wave contour that defines the shape of central web 72. The upper tool insert 78 is mounted on the lower surface of the upper tool 14. The lower tool insert 80 is mounted on the upper surface of the lower tool 16.

As discussed above, the porous upper and lower tool inserts 78 and 80 are used to remove volatiles produced by the resin during processing. Therefore, the tool inserts 78 and 80 are formed of materials that allow the volatiles to flow through the tools and out through the exhaust port 19 as described below.

In the preferred embodiment, the tool inserts 78 and 80 are formed of a porous monolithic graphite or a sintered copper or bronze. The porosity of the material from which the tool inserts 78 and 80 are formed is approximately 11–25%. However, the porosity of the material used may differ depending upon the volume of volatiles produced by the resin system used.

In other embodiments, the porous tool inserts could be formed from other porous materials. For example, porous ceramic tool inserts could be used in some applications. In other applications, tools formed using an incomplete hot isostatic press (HIP) metallic tool with an adequate level of residual porosity could be used.

The pore size of the passages through the porous tool inserts 78 and 80 should be large enough to allow volatiles to pass through the tools. However, the pore size should be small enough to help keep resin from flowing into and clogging the interior of the pores. In the preferred embodiment, pore sizes range from approximately 0.001 inch to 0.004 inch.

Both sintered bronze, copper and monolithic graphic tool inserts produce good results. Monolithic graphite tools are preferred for fabricating a limited number of parts. Monolithic graphite tools are less expensive and easier to manufacture. However, monolithic graphic tools are brittle and deteriorate after a limited number of processing cycles. Sintered copper or bronze tools are preferred in applications where larger quantities of parts are to be made. Sintered bronze or copper tools are more expensive and more difficult to manufacture than monolithic graphic tools. However, sintered bronze or copper tools are more robust and damage tolerant.

The left and right tool stops 82 and 84 (FIG. 3) are mounted on the lower surface of the upper tool 14 near the opposing edges of the tool. The left and right tool stops 82 and 84 extend approximately over the length of the upper tool 14 parallel to the edges of the upper tool insert 78. The inner edges 94 (FIG. 3) of the tool stops 82 and 84 are beveled so that they slope inward from the lower surface of the tool stops to approximately the upper surface of the tool stops.

The left and right side rail tools 86 and 88 (FIG. 3) are located within the interior of the lower tool 16. The side rail tools 86 and 88 extend approximately the length of the interior of the lower tool 16. The side rail tools 86 and 88 are free to slidably move toward and away from the opposing edges of the lower tool insert 80 as shown by arrows 96 (FIG. 3). The innermost surface 95 of the side rail tools 86 and 88 define the outer surfaces of the left and right spar caps 74 and 76 (FIG. 4C) after the sine wave spar 70 (FIG. 1) is formed. The outer edges 97 (FIG. 3) of the side rail tools 86 and 88 are beveled so that they slope outward from the upper surface of the tools to the lower surface of the tools.

As illustrated in FIG. 4A, when the upper tool 14 is placed on top of the lower tool 16, the left and right tool stops 82 and 84 extend into the interior of the lower tool. The outer edges of the tool stops 82 and 84 lie adjacent the inner edges of the walls of the lower tool 14. The beveled inner edges 94 of the tools stops 82 and 84 contact and rest on the beveled outer edges 97 of the side rail tools 86 and 88.

As discussed above, the RTM tool 12 is movable between an expanded position (FIG. 4A) in which the cavity 100 of the tool has an increased volume and a contracted position (FIG. 4B) in which the volume of cavity 100 is reduced. This expansion and contraction of the cavity is used to accommodate for the decreasing volume of resin present during processing. The volume of the cavity 100 of the tool 12 is reduced by moving the side rail tools 86 and 88 inward toward the upper and lower tool inserts 78 and 80 as illustrated by arrows 114 in FIG. 4B.

Figure 6:
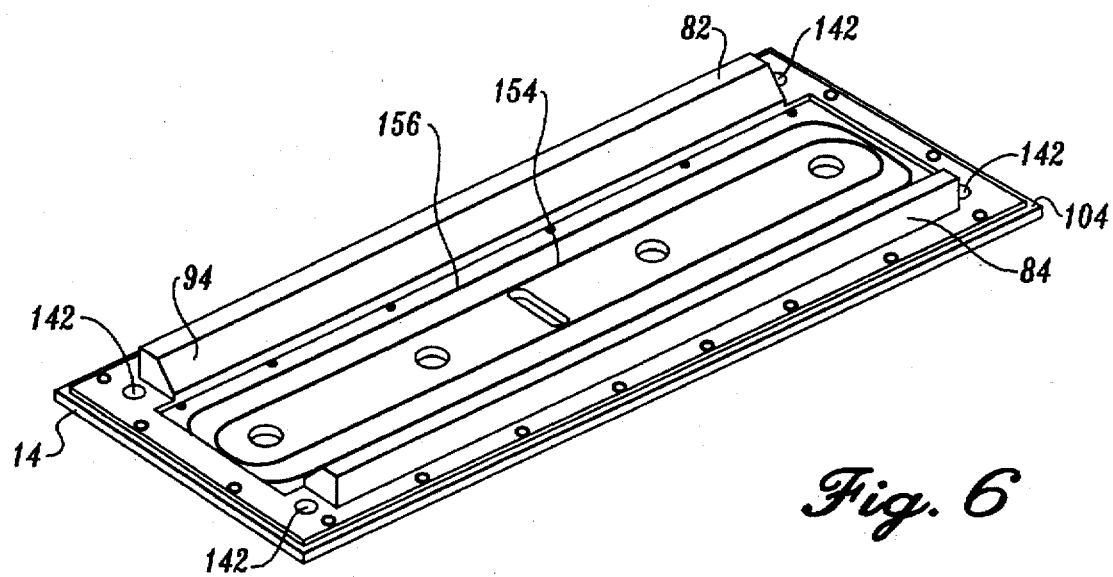
FIG. 6 is a perspective view of the upper tool of FIG. 3.

In the preferred embodiment, the RTM tool 12 is maintained in its expanded state (FIG. 4A) by placing shims 102 between the upper and lower tools 14 and 16. The shims 102 are placed within a rectangular groove 104 (FIG. 3) extending around the periphery of either the upper edge of the lower tool 16 or the lower edge of the upper tool 14 (FIGS. 6 and 8A). When the shims 102 are in place, the beveled surfaces 94 of the tool stops 82 and 84 are raised and the side rail tools 86 and 88 are moved to their outermost position as illustrated by arrows 106 (FIG. 9A). In this position, the volume of the cavity 100 is at its maximum.

Figure 4B:
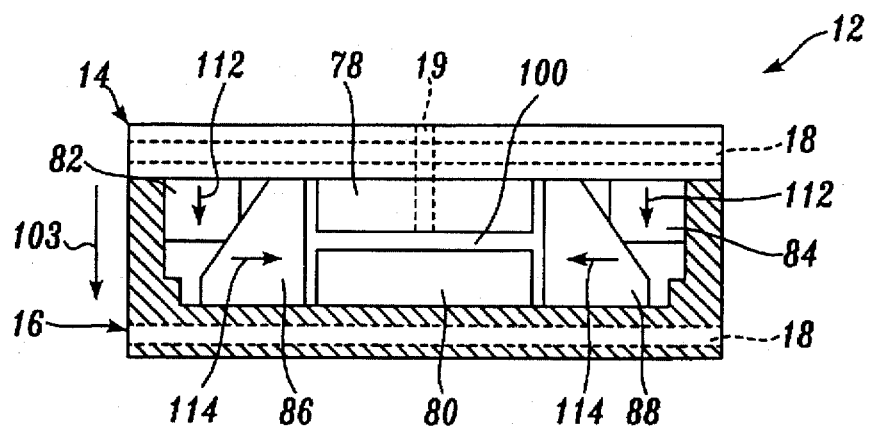
FIG. 4B is a cross-section of the tool of FIG. 2 in a closed and contracted position.
Figure 4C:
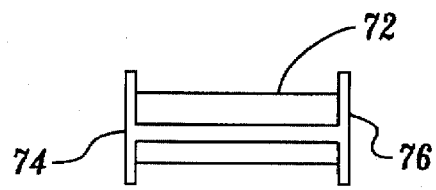
FIG. 4C is an end view of a composite sine wave spar formed in accordance with a method of the invention.
Figure 5:
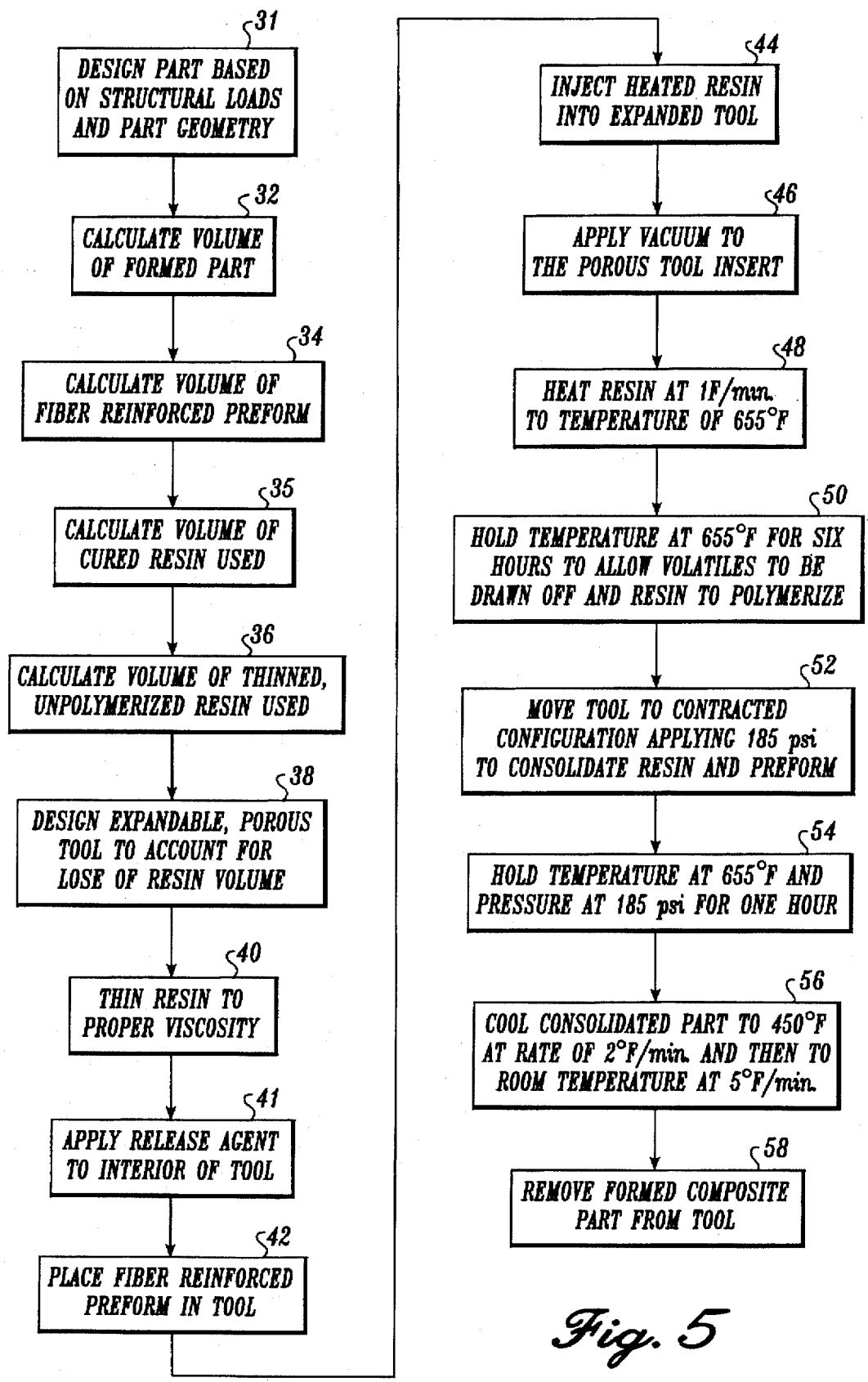
FIG. 5 is a flow chart illustrating an RTM method according to the invention.

Resin is injected into the cavity 100 when it is in its expanded configuration (FIG. 4). After the cavity 100 is filled with resin, and while the tool 12 is in its expanded configuration, the resin is heated to an elevated temperature. As the temperature of the resin is increased, the volatiles produced flow through the porous upper tool insert 78 and out through the exhaust port 19 as described below. After the resin is polymerized and a majority of the volatiles are removed, the tool 12 is moved from its expanded configuration (FIG. 4A) to its contracted configuration (FIG. 4B).

In its contracted configuration, the shims 102 are removed, allowing the upper tool 14 to move downward as illustrated by arrow 103 in FIG. 4B. As the upper tool 14 moves downward, the beveled surfaces 94 contact the beveled surfaces 97 and push the side rail tools 86 and 88 inward as illustrated by arrows 114. As the side rail tools 86 and 88 move inward, they reduce the volume of the cavity 100 (FIG. 4B). The downward movement of the upper tool insert 78 also decreases the volume of the cavity 100.

The decreasing volume of the cavity 100 forces any remaining volatiles out through the upper tool insert 78 and exhaust port 19 as described below. The movement of the side rail tools 86 and 88 also places a consolidation pressure on the resin and fiber-reinforced preform (not shown) within the cavity 100. When the RTM tool 12 is in its contracted configuration as illustrated in FIG. 4B, the cavity 100 has the same dimensions as the formed composite spar 70. As discussed above, once the RTM tooling 12 is in its contracted position, it is held there for approximately one hour at 655° F. to fully consolidate the resin and fiber-reinforced preform. The temperature is then decreased and the formed part removed.

In the preferred embodiment, the tool 12 is moved between the expanded and contracted configuration by pressing downward on the upper tool 14 using a mechanical clamp, press or autoclave. In alternate embodiments of the invention, other methods or apparatus could be used to move the tool between its expanded and contracted configurations.

Similarly, although heaters embedded within the upper and lower tools are used in the preferred embodiment, other configurations could be used in alternate embodiments. For example, the RTM tool 12 could be placed within an autoclave. The autoclave could then be used to both heat the tool and apply a downward pressure on the upper tool 14.

To obtain good results, it is important that the tool 12 be carefully designed and sealed. Failure to properly seal the tool 12 results in resin leakage and areas of porosity within the formed parts. The preferred method of sealing the tool 12 will now be discussed by reference to FIGS. 6–9B.

Figure 7:
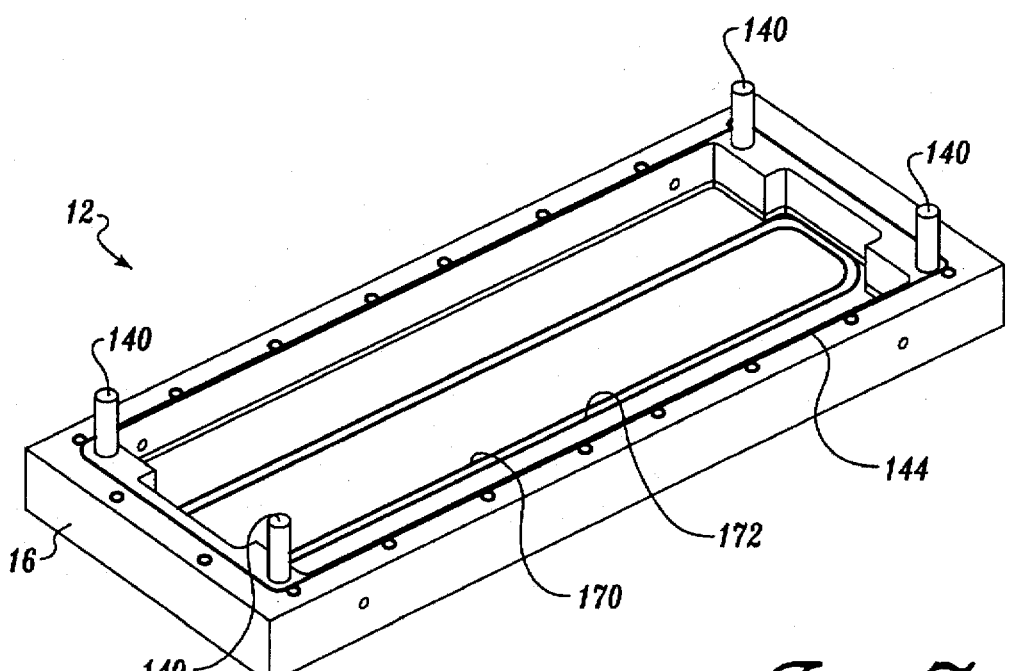
FIG. 7 is a perspective view of the lower tool of the tool of FIG. 3.

As illustrated in FIGS. 6 and 7, the upper and lower tools 14 and 16 are positioned and aligned using indexing pins 140 that extend upward from the corners of the lower tool 16 and are received within holes 142 (FIG. 6) in the upper tool. The periphery of the upper and lower tools is sealed by a gasket 144 (FIG. 7) placed within a peripheral groove 146 (FIG. 9B) in the lower tool 16. The gasket 144 helps to prevent any volatiles, resin or air from entering or exiting the interior of the tool.

The upper tool insert 78 is bolted to a rigid, impermeable attachment plate 146 using fasteners 148 (FIG. 9A). The fasteners 148 extend through the attachment plate 146 and into the lower surface of the upper tool insert 78. In order to seal the interface between the tool insert 78 and the attachment plate 146, a peripheral gasket (not shown) is placed within a peripheral groove 150 (FIG. 9A) that extends around the periphery of the porous tool insert 78.

The attachment plate 146 is in turn attached to the upper tool 14 using fasteners 152 (FIG. 9A). The fasteners 152 extend upward through the attachment plate 146 and are received within holes in the upper tool 14. The fasteners 152 do not extend through the entire thickness of the upper tool 14. The interface between the attachment tool 146 and upper tool 14 is sealed using two peripheral seals 154 and 156 (FIG. 6). The gaskets 154 and 156 are located within peripheral grooves 158 and 160 (FIG. 9A) in the lower surface of the upper tool.

The lower tool insert 80 is fastened to an attachment plate 164 (FIG. 9B) using fasteners 166. The fasteners 166 extend through the plate 164 into the lower tool insert 80. The interface between the lower tool insert 80 and the plate 164 is sealed using a seal placed within a peripheral groove 168 (FIG. 9B) in the upper surface of the plate 164. The plate 164 is attached to the lower tool 16 using fasteners (not shown) that extend through the plate and are received within holes (not shown) in the lower tool. The interface between the lower plate 164 and the lower tool 16 is sealed using two peripheral seals 170 and 172 (FIG. 7). The seals 170 and 172 are located within peripheral grooves 174 and 176 (FIG. 9B) in the upper surface of the lower tool.

As illustrated in FIG. 9B, the side rail tools 86 and 88 rest upon the lower attachment plate 164 and are free to move slidably toward and away from the lower tool insert 80 as shown by arrows 96. The interface between the lower surfaces of the side rail tools 86 and 88 and the attachment plate 164 are sealed using seals (not shown) placed within grooves 180 (FIG. 9B) in the upper surface of the attachment plate 164. The grooves 180 and the seals extend the length of the side rail tools 86 and 88.

The upper surfaces 182 (FIG. 9B) of the side rail tools 86 and 88 (FIG. 9B) are sealed to the upper attachment plate 146 (FIG. 9A) when the RTM tool 12 is in its contracted position. The interface between the upper surfaces 182 and the attachment plate 146 are sealed using seals (not shown) located within grooves 184 in the lower surface of the attachment plate 146. The grooves 184 and seals extend the length of the side rail tools 86 and 88.

It is important that the various seals used in the RTM tool 12 be formed of a seal material that can withstand the high pressures and temperatures present during processing. In the preferred embodiment, the seals are formed of Teflon or an iron-filled silicon rubber. If Teflon seals are used, it is important to take into account Teflon's high coefficient of thermal expansion above approximately 550° F. Sufficient space must be allocated to allow the Teflon seals to expand and contract while maintaining a proper seal.

Figure 10:
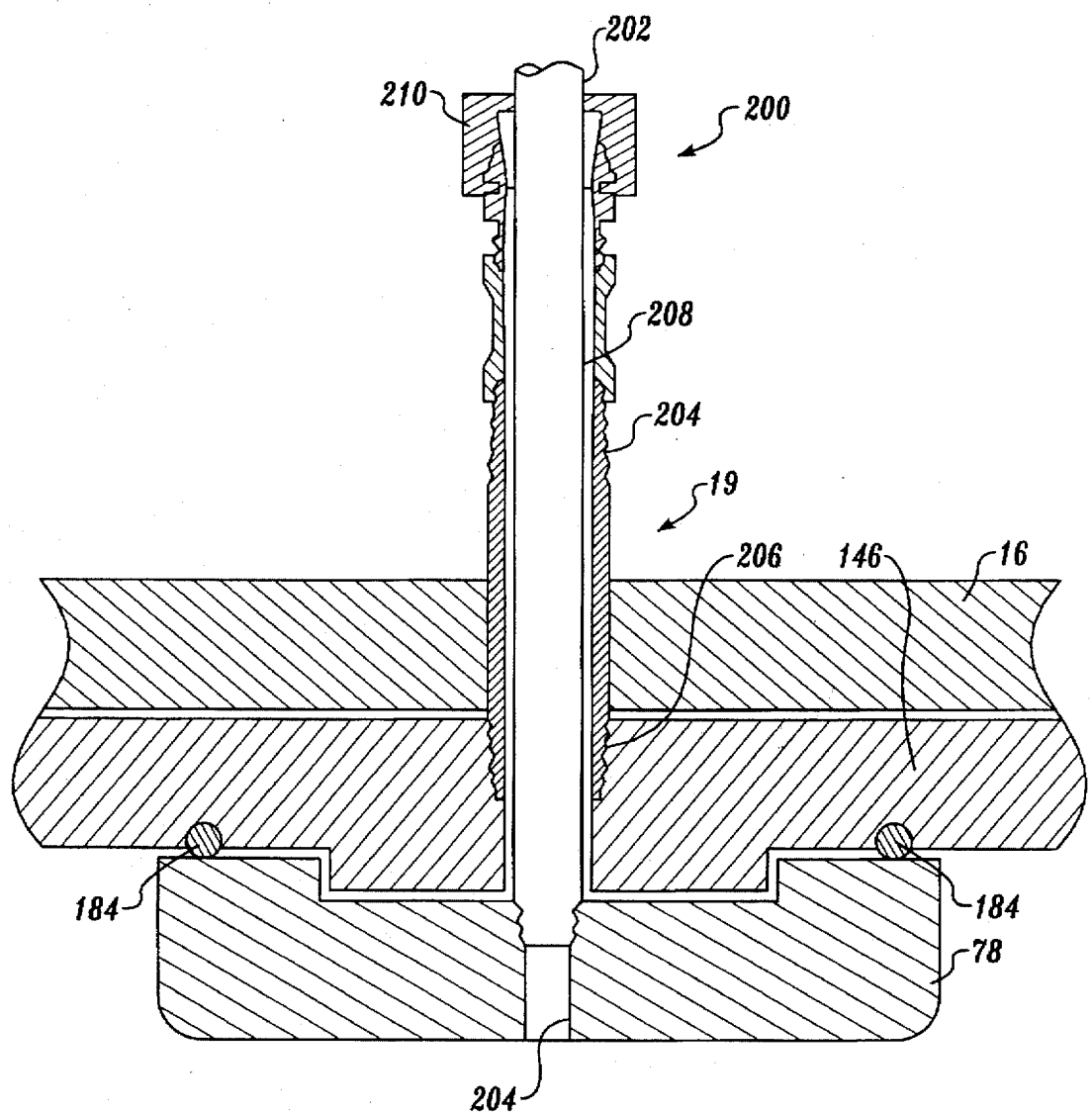
FIG. 10 is an enlarged, cross-section of the upper tool, upper tool insert, and the resin injection/exhaust port.

The preferred method of injecting resin into the interior of the RTM tool 12 and withdrawing volatiles from the tool will now be discussed by reference to FIG. 10. Resin is injected into the tool 12 and gaseous volatiles are withdrawn from the tool through a single injection/exhaust port 19.

The exhaust port 19 extends through the upper tool 16, the upper attachment plate 146, and the upper porous tool 78. A combination injection/exhaust fitting 200 is threaded into the port 19. The fitting 200 includes a central cylinder 202 that is nested within an outer cylinder 204. The central cylinder 202 has a smaller diameter than the outer cylinder 204, thus creating a gap 208 between the two cylinders.

The lower end of the central cylinder 202 is threaded into a threaded passageway 204 in the upper tool insert 78. The other end of the central cylinder 202 is connected to the injection nozzle of the constant displacement pump 24 (FIG. 1). The lower end of the outer cylinder 204 extends through the upper tool 16 and is threaded into the attachment bracket 146. The upper end 210 of the outer cylinder is attached to an evacuation system used to draw off the volatiles produced by the resin during processing. The evacuation system can be the exhaust system on an autoclave or any other suitable vacuum system.

Resin is injected through the central cylinder 202 into the interior of the tool 12. Volatiles produced by the resin during processing flow through the passages in the upper tool insert 78. The volatiles then flow through the gap 208 between the central and outer cylinders 202 and 204 and out through the upper end 210 of the outer cylinder 204.

Although only a single injection/exhaust port is illustrated, multiple ports could be used in alternate embodiments of the invention. In addition, injection and/or exhaust ports could also extend through the lower tool 16 and lower tool insert 80. However, it has been found that the volatiles produced by the resin during processing tend to rise due to convection. Therefore, the volatiles are more easily removed by withdrawing them upward through the top of the tool.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of forming a composite part from a resin that emits large volumes of volatiles during processing, the method comprising:

providing a mold having a cavity that establishes the shape of the composite part;

placing a fiber reinforced preform in the cavity;

injecting the resin into the cavity;

heating the resin to a temperature at which the resin emits volatiles;

withdrawing the volatiles through a porous tool insert out of the cavity;

placing a consolidation pressure on the resin and reinforced preform to form the composite part.

2. The method of claim 1, wherein the resin is an unpolymerized thermoplastic resin.

3. The method of claim 2, further comprising thinning the thermoplastic resin with an appropriate solvent until the resin has a viscosity appropriate for injecting.

4. The method of claim 1, further comprising maintaining the resin at an elevated temperature until the majority of the volatiles are withdrawn.

5. The method of claim 1 further comprising placing a consolidation pressure on the resin and reinforced preform to form the composite part after the majority of the volatiles have been withdrawn from the resin.

6. The method of claim 1, further comprising elevating the temperature of the resin at a rate of approximately 1° F. per minute.

7. The method of claim 1, further comprising maintaining the temperature of the resin at an elevated temperature at which the resin emits volatiles for approximately six hours.

8. The method of claim 1, further comprising reducing a volume of the cavity to take into account volatiles withdrawn from the cavity.

9. The method of claim 8, further comprising using one or more movable tool inserts within the mold to reduce the volume of the cavity.

10. The method of claim 1, further comprising maintaining a consolidation pressure on the resin and reinforced preform for a period of approximately one hour.

11. The method of claim 1, further comprising cooling the composite part at a rate between approximately 1° and 5° F. per minute.

12. A method for resin transfer molding thermoplastic composite parts, comprising:

thinning an unpolymerized thermoplastic resin with a volatile solvent to a viscosity at which the resin may be injected into a mold having a cavity that establishes the dimensions of the composite part;

injecting the thinned resin into the cavity;

heating the resin to a temperature at which the resin polymerizes;

further heating the resin to an elevated temperature at which the resin emits volatiles;

withdrawing the volatiles, including the solvent, at the elevated temperature from the cavity; and placing a consolidating pressure on the resin to form the composite part.

13. The method of claim 12, further comprising placing a fiber reinforced preform within the cavity prior to injecting resin into the cavity.

14. The method of claim 12, further comprising reducing the size of the cavity in order to account for loss in resin volume due to the withdrawal of gaseous volatiles from the cavity.

15. An apparatus for resin transfer molding a composite part formed of a resin that emits large volumes of gaseous volatiles during processing, the apparatus comprising:

a tool having a cavity that defines the dimensions of the composite part;

an injection pump that injects the resin into the cavity;

one or more porous tool inserts located in the cavity, the porous inserts allowing volatiles produced by the resin to flow through the inserts and out of the cavity;

an evacuation system for withdrawing the volatiles through the porous inserts and out of the cavity; and a heater for heating the resin within the cavity to a temperature at which the resin emits volatiles.

16. The apparatus of claim 15, wherein the tool is movable between an expanded configuration and a retracted configuration, the cavity having a reduced volume when the tool is in the contracted configuration.

17. The apparatus of claim 15, further comprising one or more articulated tool inserts within the cavity, the tool inserts altering the volume of the interior cavity and applying a consolidation force to the resin within the cavity.

18. The apparatus of claim 15, wherein the porous tool inserts are formed of a porous graphite material.

19. The apparatus of claim 15, wherein the porous tool inserts are formed of a sintered bronze material.

20. The apparatus of claim 15, wherein the porous tool inserts include a forming surface that establishes the dimensions of at least part of the composite part.

21. An apparatus for resin transfer molding a fiber reinforced thermoplastic composite part, comprising:

(a) a tool having an interior cavity that establishes the dimensions of the composite part, the tool being movable between an expanded configuration and a contracted configuration, the interior cavity having a reduced volume in the contracted configuration;

(b) means for injecting the thermoplastic resin into the interior cavity;

(c) a heater for heating the thermoplastic resin to a temperature at which volatiles are emitted from the resin;

(d) means for withdrawing the volatiles from the cavity; and (e) means for consolidating the thermoplastic resin by moving the tool from the expanded to the contracted configuration.

\* \* \* \* \*